April 16, 1963  J. H. BARNES  3,085,829
DETACHABLE SIDEWALL TRIM RING
Filed March 3, 1959  3 Sheets-Sheet 1

*INVENTOR.*
JAMES H. BARNES
BY Oldham & Oldham
ATTYS.

INVENTOR.
JAMES H. BARNES
BY Oldham & Oldham
ATTYS.

April 16, 1963 J. H. BARNES 3,085,829
DETACHABLE SIDEWALL TRIM RING
Filed March 3, 1959 3 Sheets-Sheet 3
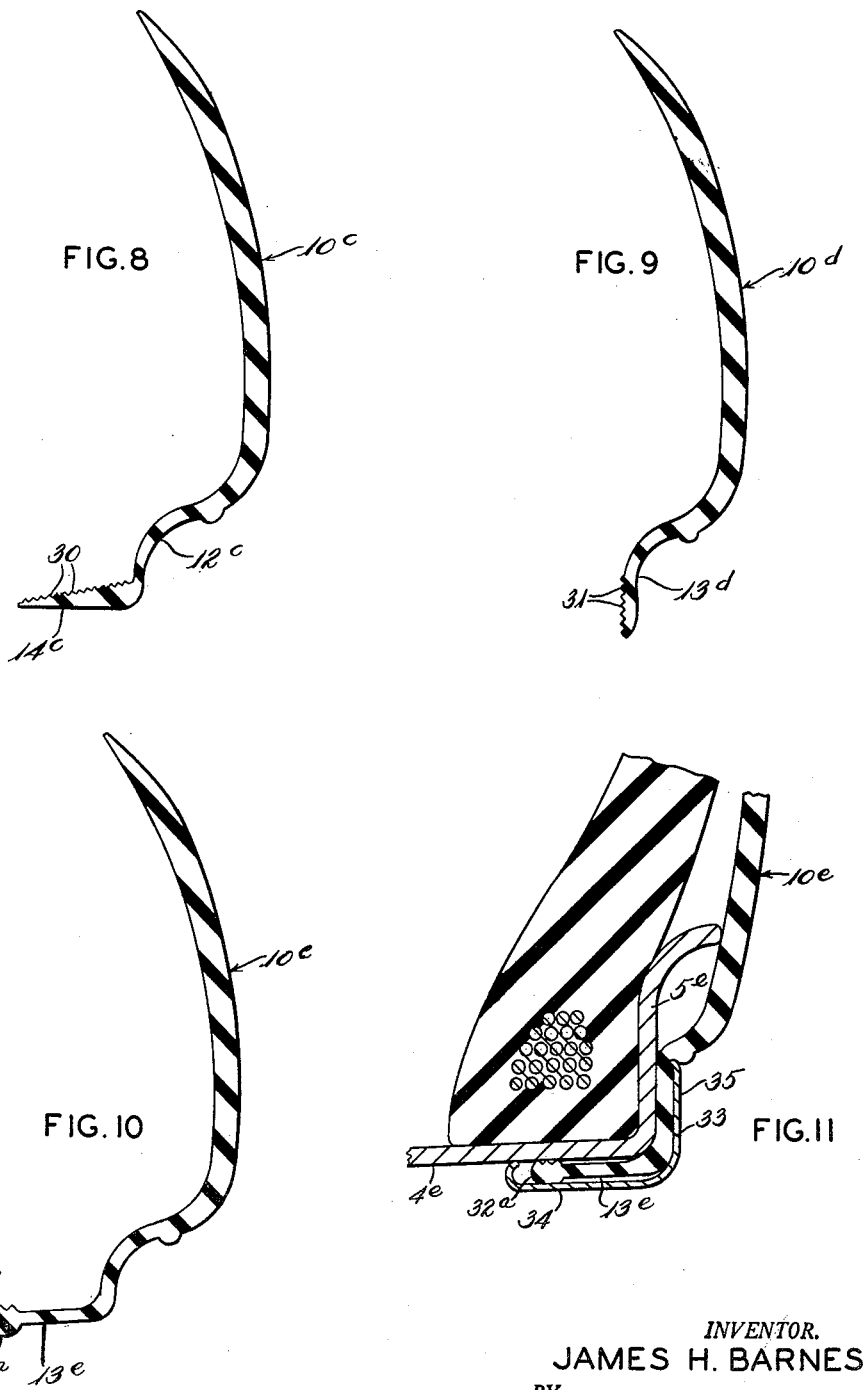
INVENTOR.
JAMES H. BARNES
BY Oldham & Oldham
ATTYS.

United States Patent Office 3,085,829
Patented Apr. 16, 1963

3,085,829
DETACHABLE SIDEWALL TRIM RING
James H. Barnes, 154 1st St., Wadsworth, Ohio
Filed Mar. 3, 1959, Ser. No. 796,899
4 Claims. (Cl. 301—37)

The present invention relates to decorative sidewalls for pneumatic tire and wheel assemblies, and especially to a detachable sidewall trim member or ring especially adapted for convenient engagement with a pneumatic tire and wheel assembly, and to combinations of the trim member with the tire and wheel assembly.

Heretofore there have been various attempts made to provide removable, decorative sidewall trim members or rings for use with pneumatic tire and wheel assemblies. One very well received type of a tire trim member is shown in my own prior Patent No. 2,737,422. This sidewall trim member is held in engagement wtih a pneumatic tire and wheel assembly by means of an integral skirt or radially inner section of the trim member that is compressed between a pneumatic tire bead and the inner surface of a wheel flange. The remainder of the trim member would extend radially outwardly of the tire and wheel assembly and would overlay the sidewall portion of the tire for decorative purposes. However, the assembly of such trim members into a tire and wheel unit requires the deflation of the tire and a careful positioning of the radially inner skirt part of the trim member on the tire wheel followed by careful reinflation of the tire in order to grip the skirt portion of the trim member properly between the wheel flange and the tire bead. Thus it has been a somewhat tedious, costly process to position these trim members of the prior types in tire and wheel assemblies.

The general object of the present invention is to provide a novel and improved type of a trim member for use with tire and wheel assemblies, characterized by the fact that the trim member is adapted to be secured to the tire and wheel assembly by means of a metal wheel cover securing a radially inner portion of the trim member to a wheel rim flange, and with the remainder of the trim member extending radially outwardly of the tire and wheel assembly from the wheel cover for the decorative action desired.

Another object of the invention is to provide a decorative, removable trim member for use with pneumatic tire and wheel assemblies and wherein the trim member can be conveniently and easily positioned in secure engagement with the tire and wheel assembly without deflation of the tire.

A further object of the invention is to provide a resilient or flexible trim member for association with a tire and wheel assembly and wherein the trim member has an axially inwardly extending radially inner portion adapted for effective compression attachment to the rim portion of a tire and wheel assembly by means of the wheel cover removably engaged with such wheel.

Another object of the invention is to provide a resilient tire trim member of the type described wherein an axially inwardly directed radially inner portion is provided on the trim member, and an axially outwardly extending retaining rib or lip is provided on the trim member to aid in obtaining an effective clamping engagement of the trim member with a tire and wheel assembly by use of the resilient fingers on wheel covers of conventional construction, which fingers removably engage a wheel rim for securing the wheel cover thereto.

Another object of the invention is to provide conventional wheel covers and wheels with a trim member that can be easily and rapidly secured to the wheel assembly by the conventional wheel cover to position a radially outer portion of the trim member extending radially outwardly of the assembly and lying closely against the edges of the wheel flange and associated portions of a tire sidewall.

Another object of the invention is to provide a trim member for removable attachment to pneumatic tire and wheel assemblies wherein the trim member is secured to the tire and wheel assembly by a wheel cover or similar member compressing a portion of the trim member against the rim, and where a plurality of circumferentially extending ribs are provided on the trim member at the portion thereof engaged by the wheel cover to aid in obtaining good frictional locking engagement of the radially inner portion of the trim ring to the rim section of the tire and wheel assembly.

Further objects of the invention are to provide a trim member for a tire and wheel assembly adapted to be secured to the rim portion of a wheel by an annular member urging an axially inner portion of the trim member radially outwardly against a portion of the rim base, and by the annular member exerting an axial compression force against another portion of the trim member to press it against the sidewall of a wheel rim flange; to provide a trim member attached to a tire and wheel assembly by an annular member which deflects the trim member axially inwardly by a radially outer portion of the annular member used to secure the trim member to the wheel assembly to aid in obtaining a good clamping engagement between the trim member and the means attaching it to the wheel assembly; and to provide a trim member having an enlarged or thickened portion thereon radially inwardly of the periphery of the annular member used to secure the trim member to a wheel assembly to provide a locking rib on the trim member to aid in retaining the trim member operatively positioned.

The foregoing and other objects and advantages of the invention will be made more apparent as the specification proceeds.

Reference now should particularly be directed to the accompanying drawings, where:

FIGS. 8, 9 and 10 are vertical sections, like FIG. 6, of further modifications of trim member of the invention; and FIG. 11 is a fragmentary vertical section, like FIG. 2, but showing the use of a modified annular retaining ring securing the trim member of FIG. 10 to a tire and wheel assembly.

When referring to corresponding parts shown in the drawings and referred to in the specification, corresponding numerals are used to facilitate comparison therebetween.

Figure 1:
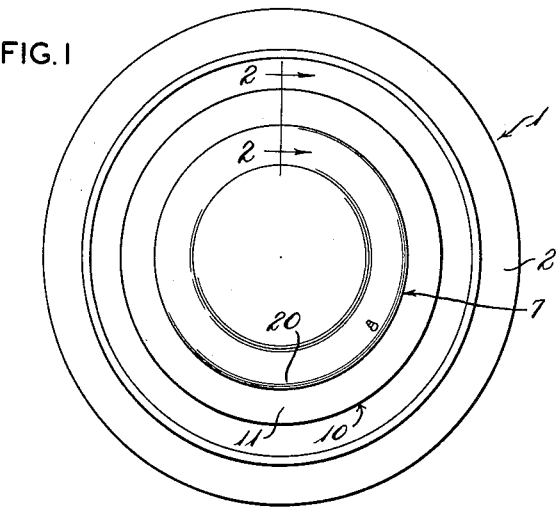
FIG. 1 is an elevation of a tire and wheel assembly having a trim member embodying the principles of the invention removably secured thereto.

The present invention, in general, relates to a resilient trim member for association with the sidewalls of pneumatic tires and adapted to be secured to a tire and wheel assembly by a removable wheel cover or the like, and where the trim member comprises a relatively flatly curved, radially outer section, and a radially inner section connecting to the radially outer section and including an end portion extending axially inwardly of the trim member as operatively associated with a tire and wheel assembly and where the axially inner part of the skirt section is adapted to be squeezed or compressed radially outwardly of the wheel against a portion of the wheel rim by a wheel cover by conventional resilient finger means, or the like, provided on the wheel cover as operatively sprung or forced into contact with the wheel rim for operative assembly of the wheel cover. The invention also covers the combination formed by assembly of the trim member with the tire and wheel unit.

Particular attention now is directed to the details of the structure shown in the accompanying drawings, and a tire and wheel assembly is indicated as a whole by the numeral 1. Such tire and wheel assembly 1 includes any conventional type of a tire 2 that is positioned on any conventional style of a wheel 3. The wheel 3 usually is of the type shown in U.S. Patents Nos. 2,819,119 or 2,862,769, for example, and includes a radially outer tire engaging rim 4 that has a conventional laterally and radially outwardly extending rim flange 5 formed thereon. This rim flange 5 normally has the bead of the tire 2 tightly seated thereagainst. The rim 4 provides, on its radially inner surface, a hollow conically shaped wall 6 at the base of the rim flange 5 that normally tapers radially inwardly at an angle of a few degrees to the wheel axis from the axially outer margin of the rim 4.

Conventional wheel covers 7 of any desired construction are provided for engaging with the inner wall 6 of the rim 4 to be removably secured thereto, as by means of a plurality of circumferentially spaced generally axially inwardly extending resilient fingers 8 that are turned radially outwardly and axially backwardly upon the remainder of the fingers 8 to form substantially U-shaped axially inner ends 9 on the fingers 8. Such fingers 8 at the U-shaped ends 9 thereof usually bite or otherwise solidly grip into the associated metal surface of the wall 6 of the rim to retain the wheel cover effectively in engagement with the wheel and tire assembly 1.

Figure 3:
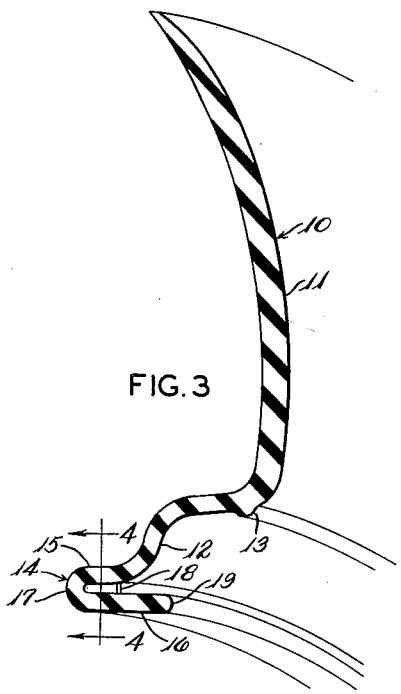
FIG. 3 is a vertical section of the trim member in its molded contour, with a connecting portion of the trim member shown in perspective.

The novel and improved tire sidewall trim member 10 of the invention is made from any suitable material of any desired color, such as natural rubber, so-called synthetic rubber, rubber-like materials, or other equivalent substances so that the trim member, which usually is molded to a desired contour, has an inherent resiliency and flexibility provided therein. Likewise, the trim member 10 has appreciable strength and inherent elasticity to maintain itself in effective operative engagement with the tire and wheel assembly 1. The trim member 10 includes a radially outer section 11 that is of relatively flatly curved contour and is of convex shape on its axially outer surface, as best shown in FIG. 3. A radially inner, or skirt section 12 is also provided on the trim member 10 and it is curved to extend generally radially and axially inwardly but to smoothly blend into and connect to the radially outer section 11. A rib 13 is shown on the axially outer wall of the trim member 10 at the portion thereof that may be considered the connection between the radially outer and radially inner sections of the trim member.

As an important feature of the invention, the trim member 10 in the radially inner or skirt section 12 thereof terminates in a generally axially inwardly exending end portion 14 that, in its uncompressed molded shape, is of generally U-shape in section. Thus the end portion 14 of this skirt section 12 has a pair of radially spaced generally parallel walls 15 and 16 connected by a base 17 and with the base 17 normally being at the axially inner end of the end portion 14 and with the U-shaped end portion being open in an axial outward direction. Preferably these walls 15 and 16 have integrally molded therewith a plurality of circumferentially spaced, relatively thin reinforcing ribs 18 that extend between and connect adjacent surfaces of the walls 15 and 16 to aid in maintaining the original molded shape thereof. Such ribs 18, in all events, only extend approximately one half the axial length of this end portion 14 and with, for example, eight to twelve of these ribs 18 being provided at equally circumferentially spaced portions of the trim member 10 in conventional size wheel and tire constructions.

FIG. 3 of the drawing best shows that the radially inner portion or skirt section 12 of the trim member, and the end portion 14 thereof, terminate in an axially outwardly directed freely movable margin or edge 19 that can be distorted in any direction by forces applied thereto, as by the wheel cover 7.

Figure 2:
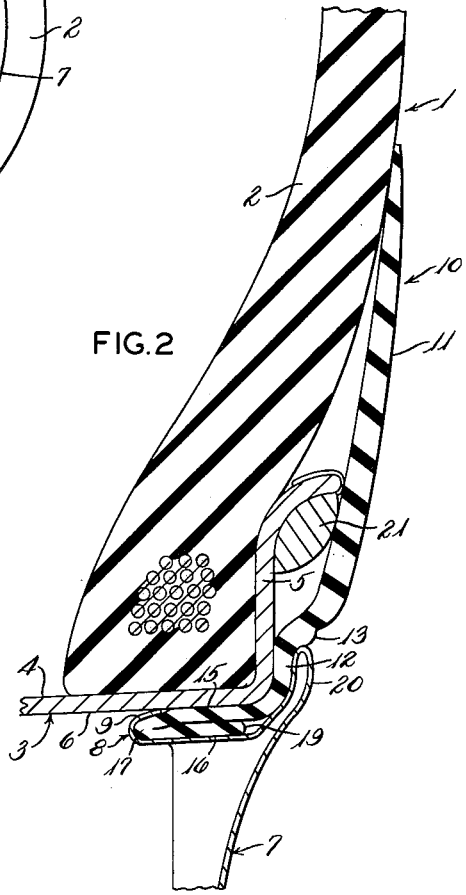
FIG. 2 is an enlarged vertical section taken on line 2—2 of FIG. 1 through a trim member and wheel assembly of the invention.
Figure 4:
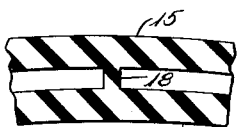
FIG. 4 is a fragmentary enlarged section through the compressible radially inner securing flange of the trim member taken on line 4—4 of FIG. 3.

FIG. 2 of the drawings best shows that the wheel cover 7 usually has a marginal flange 20 provided thereon extending radially outwardly beyond the resilient fingers 8 of the wheel cover, This flange 20 will engage the radially outer part of the radially inner skirt or section 12 of the trim member and will force it axially inwardly to at least substantially flatten it against an associated wall or surface of the rim flange 5. The pressure applied to this part of the radially inner skirt section 12 of the trim member in general forces the radially outer section 11 of the trim member axially inwardly towards the rim flange 5 and the sidewall of the tire 2. Usually the radially outer section 11 of the trim member will be in light pressure engagement with the laterally outer edge of the rim flange 5, although it may be axially spaced from such rim flange edge, depending upon the particular initial molded contour of the trim member, and the exact size relationship of the rim flange 5, tire and other associated parts including the wheel cover. Normally the radially outer section 11 of the trim member is partially flattened from its original molded contour when operatively engaged with a tire and wheel assembly like the assembly 1 of the invention to set up forces therein aiding in retaining the outer section 11 in resilient engagement with the tire 2. In all events, the trim member 10 will usually bridge over between portions of the rim flange 5 intermediate the lateral outer edge thereof and the base of such rim flange where members, such as conventional wheel weights 21, can be received for conventional wheel balance action.

Figure 5:
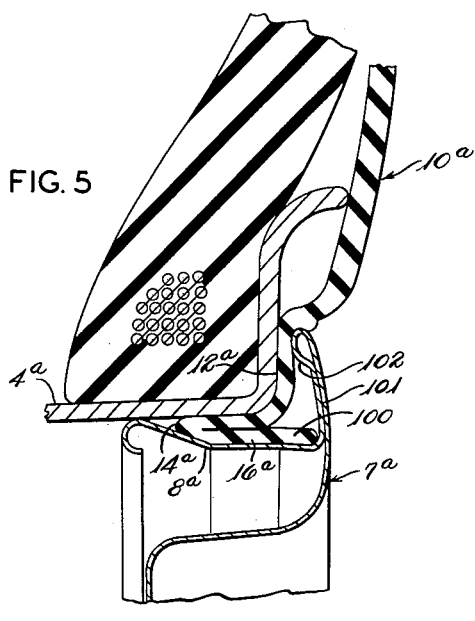
FIG. 5 is another fragmentary enlarged vertical section of the trim member and wheel assembly but showing the trim member engaged by a wheel cover of different design.

The assembly in FIG. 5 of the drawings, differs in showing that an end portion 14a of the trim member 10a is received on an axially inwardly extending band or flange 8a of a wheel cover 7a, which is of conventional design differing from the wheel cover 7. In all events, the resilient flange 8a of the wheel cover 7a will effect a radially outwardly directed compressionable force on the end portion 14a of the trim member to squeeze such part of the trim member against the inner wall of the rim 4a of the wheel so that a good compressive engagement will be provided between that section of the trim member and the wheel and wheel cover assembly. The end portion 14a has a radially inner wall 16a which extends axially outwardly beyond the base of the flange on the rim 4a. Such wall 16a hence provides a free end, wall, or edge 100 to engage a flange 101 on the wheel cover 7a. A rib, bead or other axially inwardly extending member 102 is present on the flange 101 and aids in retaining the trim member in position by being located to engage the edge 100 on any pulling out movement of the end portion 16a. By this effective engagement of the end portion 14a of the trim member, and with the flange 101 pressing a portion of the skirt section 12a of the trim member against the rim, an effective operative association and engagement is provided between the trim member and the remainder portions of the tire and wheel assembly so that a good, operative assembly has been provided.

Because I am positioning the sidewall trim member, or ring 10 in engagement with the tire and wheel assembly 1 primarily by radially outwardly directed forces, and because the normal forces exerted on the trim member 10 in operation are circumferentially outwardly directed forces on the radially outer section 11 of the trim member, I have obtained a particularly effective, but releasable engagement between the trim member and the other portions of the tire and wheel assembly. Hence in use, the trim members of the invention have been found to be retained effectively in operative engagement with the tire and wheel assembly even at high speeds. Furthermore, even if the outer section 11 of the trim member 10 or 10a is forceably engaged with disruptive forces, such as by scraping up against a curb, the end portions 14 and 14a of the trim member will still retain the trim member in effective operative engagement with the tire and wheel assembly. When such other forces are removed, as when the wheel is pulled away from the curb, the inherent resiliency and flexibility in the trim members will cause them to go back into the operative positions shown in the drawings.

Figure 6:
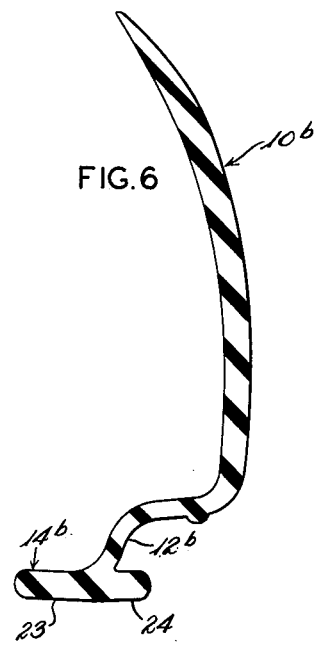
FIG. 6 is a vertical section of a modified trim member of the invention.
Figure 7:
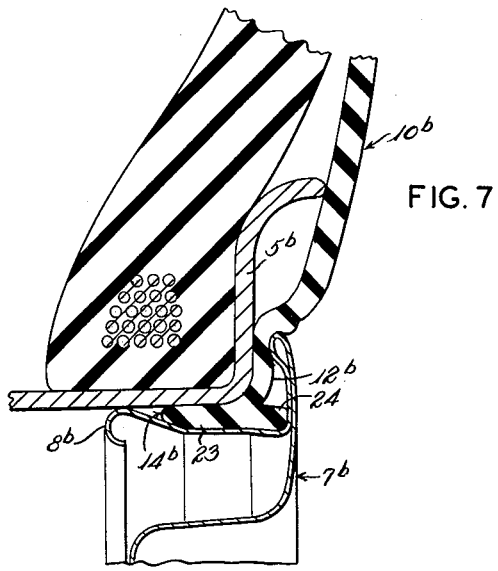
FIG. 7 is a fragmentary vertical section showing the trim member of FIG. 6 operatively positioned on a tire and wheel assembly.

A modified trim member 10b of the invention is shown in FIG. 6 and in this instance, a generally axially extending, single wall end portion 14b is provided in the trim member and with the remainder of the skirt section or inner section 12b of the trim member engaging such end portion 14b intermediate the ends thereof. Thus an axially inwardly directing wall or length 23 is provided in the trim member 10b for engagement with a resilient finger or flange 8b of an associated wheel cover 7b, and an axially outwardly directed length or section 24 is provided in this end portion 14b for compression and frictional engagement with associated portions of the wheel cover 7b to aid in maintaining the trim member 10b in effective operative engagement with this rim and rim flange 5b as shown in FIG. 7.

It will be understood that any suitable types of resilient finger means, like the fingers 8, or flanges, like the flange ring 8a in FIG. 5, or equivalent members, can be provided on wheel covers, and extending generally axially inwardly therefrom, to secure the trim members to a wheel by a wheel cover. These trim members may be partially or fully seated in or on such finger or flange means by axially extending radially inner end portions of the trim members. The end portions engage varying lengths of the fingers 8 or flange ring 8a dependent upon the relative size of such parts, but in all events are forced against the wheel rim at one or more areas by the associated wheel cover. Such end portions may have axial outer edges or sections, as shown in FIGS. 5 and 7, that are freely distortable to provide edge lengths or ribs, in effect, for engaging flanges or ribs on a wheel cover to further aid in maintaining good operative engagement between the tire and wheel assembly and the trim member.

A modified trim member 10c is shown in FIG. 8, and in this instance, the axially inwardly extending end portion 14c is of tapered thickness, and includes a plurality of annular ribs 30 thereon. These ribs 30 can be of any reasonable height and may be provided on both the radially inner and radially outer surfaces of this end portion 14c, if desired, although in this instance the ribs are only shown on the radially outer surface of the end portion 14c where it would be brought into pressure engagement with the base portion of a rim on a wheel. The base of this end portion 14c where it connects to the remainder of the trim member 10c preferably is of greater thickness than the adjacent connecting arcuate skirt portion or section 12c to aid in providing a locking rib on the trim member to resist radially outward movement of the skirt section of the trim member when it is mounted on a tire and wheel assembly operating at high speeds.

FIG. 9 shows a further trim member 10d of the invention wherein the radially inner or skirt portion 13d of the trim member is of generally radially inwardly extending shape. Again a plurality of lock ribs 31 are provided in concentric relation to each other on one part of this radially inner end portion 13d of the trim member 10d. In this instance, the end portion 13d, or part of it, can be bent or deflected axially inwardly by the wheel cover or other annular member used for attaching the trim member 10d to a tire and wheel assembly.

A further modified trim member of the invention 10e is shown in FIG. 10 and it has an axially inwardly extending end portion 13e thereon. The trim member 10e, as the other trim members of the invention, all are molded initially to the shapes shown in the drawings, but are adapted to be deflected from such shapes by the engaging pressures applied thereto by an annular retaining member compressing the trim member against portions of the rim in a tire and wheel assembly. In all events, this trim member 10e at the axially inner end of the end portion 13e has an enlarged locking rib, or bead 32a provided thereon. When positioned on a rim 4e, the trim member 10e is adapted to have the rib 32a partially flattened by the wheel cover, or equivalent member used to position the trim member. In this instance, an annular metal member, or ring 33, FIG. 11, is provided to secure the trim member 10e in position. Such annular member 33 has axially inwardly extending resilient fingers 34 provided thereon. These fingers 34 may be provided at circumferentially spaced portions of the ring 33, or in some instances it may be desirable to make this finger 34 a continuous flange extending around the radially inner periphery of the annular member 33. Of course, conventional wheel covers can be used for positioning the trim member 10e, as desired, and the resilient clamping engagement necessary for holding the annular member 33 in position is provided by the fingers 34 engaging a portion of the rim base. Ribs 30e also are formed on the trim member 10e on the radially inner end portion 13e thereof for frictional engagement with the rim flange.

It furthermore should be seen that the annular member 33, like a wheel cover, will provide two retaining actions on the trim member positioned thereby. A radially outwardly extending flange 35 forms part of the annular member 33 and it exerts an axially inwardly directed compressive force urging the trim member 10e against the radially outer wall of the tire rim flange 5e. It is seen that the trim member 10e is held in position by both a radially outwardly directed force exerted by the flange or fingers 34 against one portion of the trim member, whereas an axially inwardly directed force also is exerted upon the trim member to force it against the rim flange wall. Furthermore, the trim members 10 of the invention are molded to shapes requiring axially inwardly extending forces against the skirts or radially inner portions thereof when operatively engaged with a tire and wheel assembly to aid in urging the radially outer portion of the trim members to come into resilient contact with the tire sidewall, as well as with the edge of the rim flange in most instances.

It will be realized that all of the trim members of the invention are in effect secured in position by at least two forces, one radially outwardly directed against the radially inner portion of the trim member, whereas another force is exerted axially inwardly against a spaced portion of the trim member to urge it against a wall of the rim flange. By providing any type of locking beads or ribs on the radially and/or axially inner end portions of the trim members, these enlarged locking beads or ribs are difficult to move past the retaining flanges provided on the wheel covers, or members like the annular member 33 and the retaining flange 35 thereon. Hence a very effective operative engagement action with a wheel rim is secured for the trim members of the invention.

It should be realized that the reenforcing webs, like the webs 18 shown in FIG. 3, can be of any desired axial length and may extend out to where the skirt section 12 starts to extend radially outwardly at a rather sharp angle in the trim member. FIG. 3 shows one illustrative length for these reenforcing ribs 18 but they can be of greater length to provide stronger retaining means for holding the U-shaped end portion 14 to the molded shape shown in FIG. 3. The initially U-shaped sections of the trim members 10 and 10a tend to open up when the trim members are operatively positioned and radially outwardly directed forces are exerted on the trim member. Such action aids in securing the trim member to the wheel assembly to prevent undesired release of the trim member. The trim member 10a has no ribs therein like the ribs 18 so that the edge 100 is quite freely movable for locking engagement between the rim and wheel cover, or other retaining member.

It will be realized that the trim members or rings of the invention will engage in slightly different manners with wheel covers depending on the specific construction thereof. Hence the edge portions 19, 100, and/or 24 may abut against the wheel cover, or be forced or bent radially outwardly by the wheel covers.

"Wheel cover" in this invention refers to a retaining member engaging the base, or inner surface of the tire rim portion of a wheel to be secured to the wheel by a generally axially inwardly extending section of the wheel cover, or annular ring retaining member used to secure the trim member to a wheel assembly.

In view of the foregoing, it is believed that a relatively sturdy, attractive trim member has been provided for tire sidewalls by the invention. Such trim member will provide a decorative or ornamental effect for a tire sidewall as the trim member can cover any desired length of the sidewall, but normally is maintained in operative engagement with the tire sidewall radially inwardly of the maximum width or shoulder portion of the tire. The trim member provides a very decorative assembly with associated tire and wheel means and provides an assembled effect of a tire of a smaller internal diameter than the actual diameter of the tire in the assembly. The trim member is secured in position by completely conventional means on the wheel cover and rim. Such members are associated with each other in accordance with conventional practices, but at the same time will effectively bond or secure the trim member in operative engagement therewith. Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. A resilient trim member for pneumatic tires and adapted to be secured to a tire and wheel assembly by a removable wheel cover, said trim member comprising a relatively flatly curved radially outer section and a radially inner section connecting to said radially outer section, said radially inner section including a generally radially and axially inwardly extending curved portion terminating in an axially inwardly extending end portion, said end portion being of substantially U-shape in section with the base of the U being at the axially inner edge of said end portion, said U-shaped section having axially extending integral reenforcing ribs therein, said U-shaped section being adapted to be flattened and be compressed radially outwardly by a wheel cover when engaging a wheel with the trim member positioned thereon to secure the trim member to such tire and wheel assembly.

2. A resilient tire sidewall trim member for pneumatic tires adapted to be secured to a tire and wheel assembly by a removable wheel cover, said trim member comprising a relatively flatly curved radially outer section and a radially inner section connecting to said radially outer section, said radially inner section including a radially and axially inwardly extending curved portion terminating in an axially inwardly extending end portion, said end portion being of substantially U-shape in section with the base of the U being at the axially inner edge of said end portion and with the open end of the U being axially outwardly directed, said U-shaped section having axially extending circumferentially spaced integral reenforcing ribs extending between and connecting the walls of such section, said U-shaped section being compressed radially outwardly by a wheel cover when engaging a wheel with said end portion of said trim member being pressed against said wheel to secure the trim member to such tire and wheel assembly.

3. A resilient tire sidewall trim member for pneumatic tires and adapted to be secured to a tire and wheel assembly by a removable wheel cover, said trim member comprising a relatively flatly curved radially outer section and a radially inner section extending at substantially right angles thereto connecting to said radially outer section, said radially inner section terminating in an axially inwardly extending end portion, said end portion being of substantially U-shape in section with the base of the U being at the axially and radially inner edge of said end portion and being remote from said outer section and with the open end of such end portion facing axially outwardly, said U-shaped section terminating in an axially outwardly directed wall at the radially inner margin of the trim member, said U-shaped section being adapted to be compressed radially outwardly against a portion of the wheel by wheel engaging means on a wheel cover when engaging a wheel and with said wall providing a free end for engaging the wheel cover.

4. A resilient trim member for pneumatic tires, said trim member being molded of rubber like material and comprising a relatively flatly curved radially outer section adapted to engage the outer side wall portion of such tire, a radially inner skirt section having a molded curved contour extending axially inwardly and then radially inwardly from said outer section, and a radially inner end section extending from said skirt section and formed with an enlarged bead thereon formed with a plurality of annular ribs, said skirt section and said end section being adapted to be compressed between a tire seating rim and removable wheel cover therefor with said outer section engaging the outer side wall portion of a tire seated on said rim.

References Cited in the file of this patent

UNITED STATES PATENTS

| | | |
|---|---|---|
| 2,618,513 | Horn | Nov. 18, 1952 |
| 2,624,634 | Lyon | Jan. 6, 1953 |
| 2,736,610 | Waite | Feb. 28, 1956 |
| 2,819,119 | Perrin | Jan. 7, 1958 |
| 2,862,769 | Wood | Dec. 2, 1958 |
| 2,963,325 | Aske et al. | Dec. 6, 1960 |
| 2,970,009 | Lyon | Jan. 31, 1961 |

FOREIGN PATENTS

| | | |
|---|---|---|
| 1,061,278 | France | Nov. 25, 1953 |
| 61,528 | France | Nov. 24, 1954 |
| | (1st addition to 1,015,295) | |
| 566,768 | Italy | Sept. 16, 1957 |
| 569,143 | Belgium | July 31, 1958 |

(Corresponding Great Britain Patent 841,418, July 13, 1960)